US008914487B2

(12) United States Patent
Li et al.

(10) Patent No.: US 8,914,487 B2
(45) Date of Patent: Dec. 16, 2014

(54) METHOD AND APPARATUS FOR ABSTRACTING LOGICAL TOPOLOGY INFORMATION OF PEER-TO-PEER NETWORK

(75) Inventors: Chunxiu Li, Shenzhen (CN); Yan Wang, Shenzhen (CN); Guoyi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 13/299,046

(22) Filed: Nov. 17, 2011

(65) Prior Publication Data

US 2012/0066368 A1    Mar. 15, 2012

Related U.S. Application Data

(63) Continuation of application No. PCT/CN2010/071816, filed on Apr. 16, 2010.

(30) Foreign Application Priority Data

May 18, 2009   (CN) .......................... 2009 1 0084628

(51) Int. Cl.
*G06F 15/173* (2006.01)
*H04L 29/06* (2006.01)
*H04L 12/24* (2006.01)
*H04L 12/751* (2013.01)
*H04L 12/715* (2013.01)
*H04L 29/08* (2006.01)

(52) U.S. Cl.
CPC ............. *H04L 29/06* (2013.01); *H04L 41/0213* (2013.01); *H04L 45/02* (2013.01); *H04L 45/64* (2013.01); *H04L 67/104* (2013.01); *H04L 29/08072* (2013.01)
USPC ........................................................ 709/223

(58) Field of Classification Search
None
See application file for complete search history.

(56) References Cited

U.S. PATENT DOCUMENTS 6,954,790 B2 * 10/2005 Forslow .......................... 709/227
7,336,613 B2 *  2/2008 Lloyd et al. ................... 370/237
(Continued)

FOREIGN PATENT DOCUMENTS

CN         1988449 A      6/2007
CN       101009636 A      8/2007

OTHER PUBLICATIONS

Cheng-Hsin, Hsu. and Mohamed, Hafeeda., ISP-friendly peer matching without ISP collaboration, 2008, CoNEXT '08 Proceedings of the 2008 ACM CoNEXT Conference Article No. 75, pp. 1-6.*

(Continued)

*Primary Examiner* — Lisa Lewis
*Assistant Examiner* — Olanrewaju Bucknor
(74) *Attorney, Agent, or Firm* — Brinks Gilson & Lione

(57) ABSTRACT

The present invention provides a method and an apparatus for abstracting logical topology information of a Peer-to-Peer (P2P) network. The method includes: obtaining a set of Points of Presence (POPs) of peer clients in the P2P network; using a relevant algorithm of a routing protocol to calculate a best path between any two POPs in the set of POPs and a weight value of the best path; and collecting calculation results of the best path and the weight value that are obtained on each POP to obtain a set of abstract logical topology records of the P2P network. The embodiments of the present invention provide a universal and efficient method for abstracting logical topology information, which greatly reduces network topology information that needs to be transmitted, mitigates a risk of exposing lower-layer network topology information, and transmits the network topology information to a P2P application server securely and concisely.

7 Claims, 4 Drawing Sheets

(56) References Cited

U.S. PATENT DOCUMENTS

| | | | |
|---|---|---|---|
| 7,453,824 B1* | 11/2008 | Nucci et al. | 370/254 |
| 7,586,899 B1* | 9/2009 | Mohaban et al. | 370/352 |
| 2005/0187946 A1 | 8/2005 | Zhang et al. | |
| 2006/0126611 A1* | 6/2006 | Kelly et al. | 370/389 |
| 2006/0168318 A1* | 7/2006 | Twiss | 709/238 |
| 2007/0064702 A1 | 3/2007 | Bates et al. | |
| 2008/0049619 A1* | 2/2008 | Twiss | 370/236 |
| 2009/0080336 A1* | 3/2009 | Zhang et al. | 370/248 |
| 2009/0122697 A1* | 5/2009 | Madhyasha et al. | 370/229 |
| 2009/0240758 A1* | 9/2009 | Pasko et al. | 709/201 |
| 2009/0323700 A1* | 12/2009 | Schwan et al. | 370/400 |
| 2009/0327364 A1* | 12/2009 | Schwan et al. | 707/204 |
| 2012/0271895 A1* | 10/2012 | Maenpaa et al. | 709/206 |
| 2013/0007218 A1* | 1/2013 | Shah et al. | 709/219 |

OTHER PUBLICATIONS

International Search Report issued in corresponding PCT Patent Application No. PCT/CN2010/071816, mailed Jul. 15, 2010.
Written Opinion of the International Searching Authority issued in corresponding PCT Patent Application No. PCT/CN2010/071816, mailed Jul. 15, 2010.
Office Action issued in corresponding Chinese Patent Application No. 200910084628.3, mailed Jan. 31, 2012.
Alimi et al., "P4P: Provider Portal for P2P Applications" Network Working Group, Nov. 17, 2008.
Cheng et al., "RealNet: A Topology Generator Based on Real Internet Topology" $22^{nd}$ International Conference on Advanced Information Networking and Applications-Workshops, IEEE 2008.
Office Action issued in corresponding Chinese Patent Application No. 200910084628.3, mailed Oct. 16, 2012.
Office Action issued in corresponding Chinese Patent Application No. 200910084628.3, mailed May 6, 2013, 9 pages.
Extended European Search Report issued in corresponding European Patent Application No. 10777318.6, mailed May 2, 2012.
Bonaventure et al., "The Case for an Informed Path Selection Service" Internet Engineering Task Force, Feb. 18, 2008.
Marocco et al., "Application-Layer Traffic Optimization (ALTO) Problem Statement" Network Working Group, Nov. 2, 2008.

* cited by examiner

METHOD AND APPARATUS FOR ABSTRACTING LOGICAL TOPOLOGY INFORMATION OF PEER-TO-PEER NETWORK

CROSS-REFERENCE TO RELATED APPLICATIONS

This application is a continuation of International Application No. PCT/CN2010/071816, filed on Apr. 16, 2010, which claims priority to Chinese Patent Application No. 200910084628.3, filed on May 18, 2009, both of which are hereby incorporated by reference in their entireties.

FIELD OF THE INVENTION

The present invention relates to network communications technologies, and in particular, to a method and an apparatus for abstracting logical topology information of a Peer-to-Peer (P2P) network.

BACKGROUND OF THE INVENTION

Currently, with the development of networks, people have more and more requirements for networks, especially, for large-capacity information such as music and video files, which gives rise to popularity of a P2P application. In most circumstances, however, the P2P application is unable to find a best peer sequence, which leads to performance deterioration of a server and too much inter-domain traffic. The P2P application occupies plenty of network bandwidths and limited network resources of an operator. Therefore, it is important to optimize P2P traffic.

The Application-Layer Traffic Optimization (ALTO) working group of the Internet Engineering Task Force (IETF) is committed to formulating a technical standard for application-layer traffic optimization that is performed based on cooperation between an Internet Service Provider (ISP) and a P2P application provider. The standard provides an ALTO service through the ISP, and optimizes selection of P2P resources by collecting and analyzing network topology information, with a view to reducing futile inter-domain traffic, using network bandwidth resources reasonably, and enhancing management on a P2P service.

When starting a P2P program, a client needs to requests a peer list from a P2P application server. The P2P application server may obtain network topology information through the ALTO service, optimize peer selection by using the network topology information, and return a list of preferred peers. For example, a user in Beijing may preferentially exchange a file fragment with another user in Beijing in this way.

In the process of implementing the present invention, the inventor finds that the conventional art has the following problems: No standard related to P2P traffic optimization is defined; an existing method for obtaining network topology information may enable the P2P application server to obtain lower-layer network topology information, but the amount of the lower-layer network topology information is too large and details of the operator are exposed excessively, which brings many security problems to an upper-layer application. Moreover, the large amount of transmitted network topology information seriously increases a network load, especially in an unstructured P2P network, and therefore the lower-layer network topology information is not suitable for being transmitted to the P2P application server for helping to optimize the peer selection.

SUMMARY OF THE INVENTION

Embodiments of the present invention provide a method and an apparatus for abstracting logical topology information of a P2P network to efficiently obtain logical topology information of the P2P network on the prerequisite that the network topology information that needs to be transmitted is greatly reduced.

A method for abstracting logical topology information of a P2P network includes:

obtaining a set of Points of Presence (POPs) of peer clients in the P2P network;

calculating a best path between any two POPs in the set of POPs and a weight value of the best path; and collecting calculation results of the best path and the weight value that are obtained on each POP in the set of POPs to obtain a set of abstract logical topology records of the P2P network.

An apparatus for abstracting logical topology information of a P2P network includes:

a POP set obtaining module, configured to obtain a set of POPs of peer clients in the P2P network;

a best path calculating module, configured to calculate a best path between any two POPs in the set of POPs and a weight value of the best path; and a logical topology record set obtaining module, configured to collect calculation results of the best path and the weight value that are obtained on each POP in the set of POPs to obtain a set of abstract logical topology records of the P2P network.

As seen from the foregoing technical solutions, the embodiments of the present invention provide a universal and efficient method for abstracting logical topology information, which greatly reduces network topology information that needs to be transmitted, and mitigates a risk of exposing lower-layer network topology information.

BRIEF DESCRIPTION OF THE DRAWINGS

To describe the technical solutions of the present invention more clearly, the following briefly describes the accompanying drawings involved in the description of the embodiments of the present invention. Apparently, the accompanying drawings described below are not exhaustive, and persons of ordinary skill in the art can derive other drawings without any creative effort.

DETAILED DESCRIPTION OF THE EMBODIMENTS

In the embodiments of the present invention, a set of POPs of peer clients in a P2P network is obtained. Then, a relevant algorithm of a routing protocol in the P2P network is used to calculate a best path between any two POPs in the set of POPs and a weight value of the best path, calculation results of the best path and the weight value that are obtained on each POP are collected to obtain a set of abstract logical topology records of the P2P network.

Further, network-topology-related information of the P2P network is collected, or a management information base (MIB) in the P2P network is accessed through a Simple Network Management Protocol (SNMP), and the network-topology-related information of the P2P network is obtained from the MIB.

Further, the MIB in the P2P network is accessed through SNMP, and POP role information in the P2P network is obtained from the MIB; or the POP role information in the P2P network is obtained based on a static configuration condition of the P2P network.

Further, a relevant algorithm of the routing protocol is used to calculate the best path between a source POP and a destination POP in the set of POPs and the weight value of the best path according to the POP role information in the P2P network, or according to the POP role information in the P2P network and the network-topology-related information; and abstract logical topology records between the source POP and the destination POP is obtained according to the best path and a corresponding weight value record.

The abstract logical topology records of each POP pair in the set of POPs are collected to obtain the set of abstract logical topology records of the P2P network.

Further, when multiple equivalent best paths exist between the source POP and the destination POP, one of the paths is selected as the best path.

Further, an abstract logical topology record between the source POP and the destination POP includes: the source POP, the destination POP, and the weight value of the best path between the source POP and the destination POP; or, all POPs on the best path between the source POP and the destination POP, and the weight value of the best path.

To facilitate understanding of the embodiments of the present invention, the following takes several specific embodiments as examples for further description with reference to the accompanying drawings. The embodiments given herein shall not be construed as limitations on the present invention.

Embodiment 1

Figure 1:
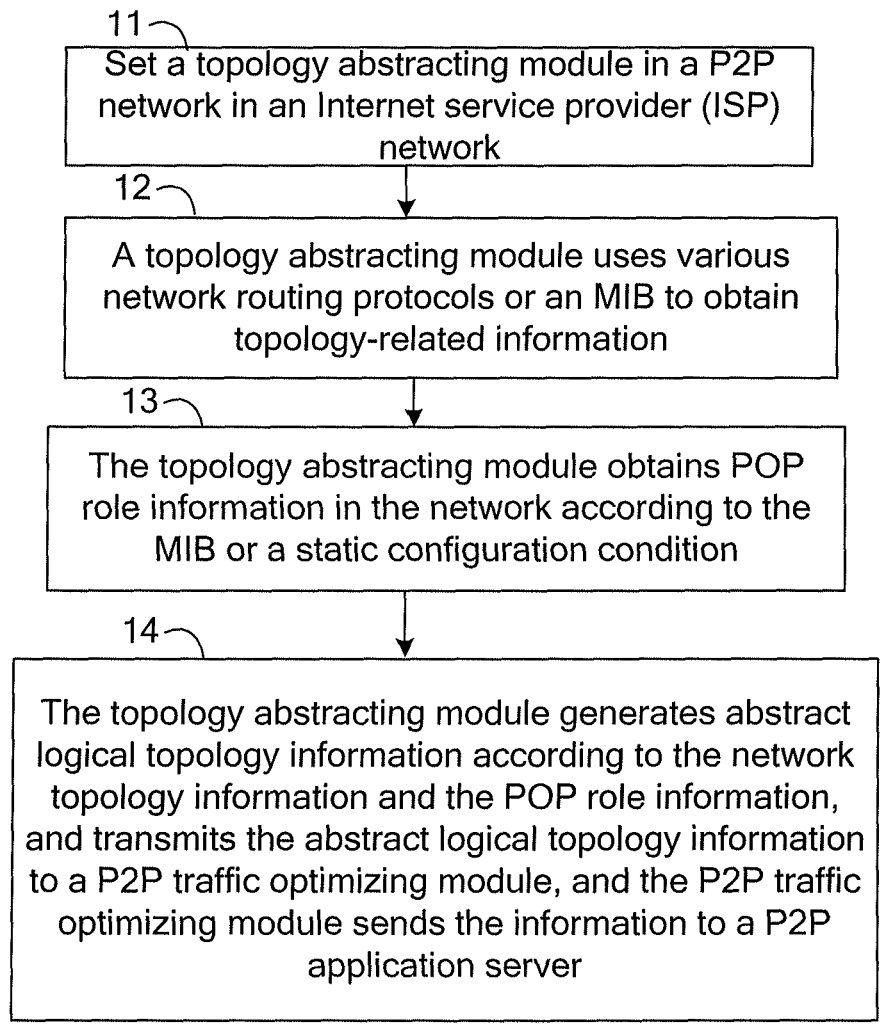
FIG. 1 is a flowchart of a method for abstracting logical topology information of a P2P network according to a first embodiment of the present invention.

FIG. 1 shows a method for abstracting logical topology information of a P2P network according to the first embodiment of the present invention. The method includes:

11. Set a topology abstracting module in the P2P network in an ISP network.

Figure 2:
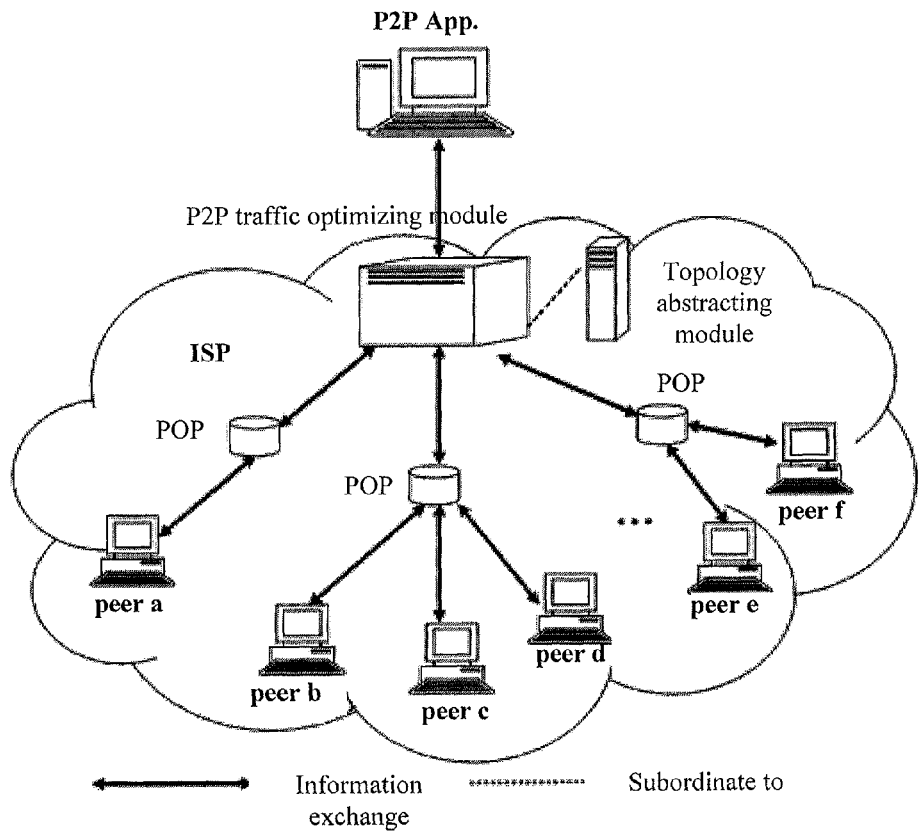
FIG. 2 is a schematic diagram of a P2P network where a topology abstracting module is set according to the first embodiment of the present invention.

In this embodiment of the present invention, a topology abstracting module is set in the P2P network of the ISP network. The topology abstracting module may be set separately, or set in a P2P traffic optimizing module in the P2P network. FIG. 2 is a schematic diagram of a P2P network where the topology abstracting module is set and that is provided in this embodiment.

As shown in FIG. 2, the topology abstracting module is set separately. The topology abstracting module in FIG. 2 implements a process of abstracting the logical topology information of the network compliant with a specified requirement, and securely transmits the abstracted logical topology information of the network to a P2P traffic optimizing module in a specific format. Then, the P2P traffic optimizing module transmits the information to a P2P application server so as to benefit peer sequence selection of the P2P application server.

12. The topology abstracting module uses various network routing protocols or an MIB to obtain topology-related information.

The topology abstracting module uses a routing protocol in an Autonomous System (AS) domain in the P2P network to collect network-topology-related information. The information includes a peer, a link, a link weight value, and so on.

The topology abstracting module may obtain the network-topology-related information by collecting and processing information based on the routing protocol in the AS domain. The routing protocol includes: an Open Shortest Path First (OSPF) Protocol, an Intermediate System to Intermediate System (IS-IS) protocol, a Border Gateway Protocol (BGP), and so on.

Taking the OSPF protocol as an example, the topology abstracting module obtains the network-topology-related information by intercepting various types of Link State Advertisements (LSAs) in the network. For example, in a passive interface mode, the topology abstracting module receives but does not send an LSA and obtains the network-topology-related information through the received LSA, so that a network operating condition is not affected.

The topology abstracting module may further get access to the MIB through SNMP and obtain the network-topology-related information, such as peers in the AS domain and adjacency relationships, a link and a weight value of the link, an interface and a state of the interface, and so on, from the MIB.

Figure 3:
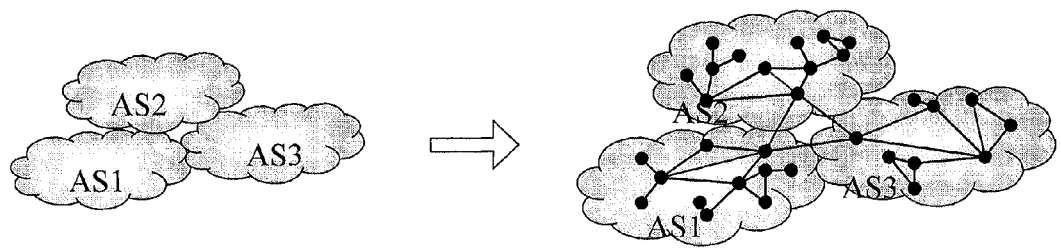
FIG. 3 is a schematic diagram of a network topology view that is constructed by a topology abstracting module according to obtained network-topology-related information in the first embodiment of the present invention.

The topology abstracting module may construct456 a network topology view according to the network-topology-related information obtained from a packet (such as an LSA of OSPF) and the MIB. FIG. 3 is a schematic diagram of a network topology view that is constructed by the topology abstracting module according to the obtained network-topology-related information in this embodiment.

In FIG. 3, three AS domains are included, and each AS domain includes multiple POPs and peer clients; however, each POP is not marked. The AS domains are connected to each other.

13. The topology abstracting module obtains POP role information in the network according to the MIB or a static configuration condition.

Configuration modes of the POPs in the network mainly include the following two modes: One mode is a private MIB storage mode, that is, the POPs are configured by a network management system, and POP configuration information is stored in the MIB of the network. In this case, the topology abstracting module may get access to the MIB through SNMP to obtain specific configuration information of the POPs. The other mode is to configure the POPs manually and statically and store the configuration information of the POPs in a database. In this case, the topology abstracting module may obtain specific configuration information of the POPs by getting access to the database. Through the foregoing processing, a set of POPs, namely, {P1, P2, . . . , Pn}, in the network is obtained.

Figure 4:
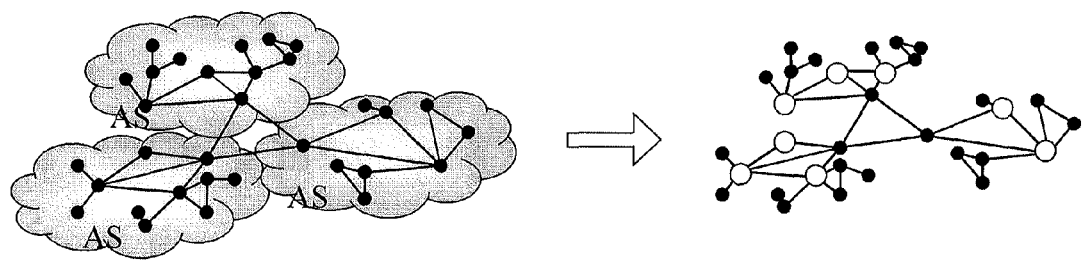
FIG. 4 is a schematic diagram of that a topology abstracting module obtains a POP role from the network topology view shown in FIG. 3 according to the first embodiment of the present invention.

FIG. 4 is a schematic diagram of basic topology, which is displayed by the topology abstracting module according to the obtained POP role information, of the POPs in the network according to this embodiment. In FIG. 4, the network topology view shown in FIG. 3 is further detailed. A white dot indicates the POP role information in each AS domain, and one or more peer clients are connected to each POP. The POPs in each AS domain communicate with each other through the routing protocol in the AS domain, and the ASs communicate with each other through an inter-domain routing protocol.

In conventional POP network architecture, the POPs are deployed on multiple levels according to different network layers. According to different required levels of topology abstraction, the topology abstracting module should be able to obtain POP information of a specified level of rather than being limited to abstract only logical network topology architecture of lowest-level POPs.

In a practical application, the POPs may also be a group or set of peer clients.

14. The topology abstracting module generates abstract logical topology information according to the network topology information and the POP role information, and transmits the abstract logical topology information to the P2P traffic optimizing module, and the P2P traffic optimizing module sends the information to the P2P application server.

The topology abstracting module performs POP-level abstraction according to the network-topology-related information and the POP role information that are obtained in the forgoing two steps, and generates logical topology information that is secure and irrecoverable, and reflects a topology structure.

The process of implementing POP-level abstraction includes: calculating a best path between any two points (Pi and Pj) in the set of POPs and a weight value (Wij) from Pi to Pj by using a relevant algorithm of the routing protocol such as a Shortest Path Tree (SPT) algorithm of OSPF according to the obtained set of POPs {P1, P2, . . . , Pn} and the network-topology-related information, where Wij may be a sum of weight values of all links on the best path from Pi to Pj. The weight value may be expressed in different modes, for example, expressed by a bandwidth, a cost, or a metric value, or expressed in a dimensionless mode. The best path from Pi to Pj serves as an abstract logical topology record between Pi and Pj.

For example, when multiple equivalent best paths exist between a source POP and a destination POP, one of the paths is selected as the best path, and the best path serves as an abstract logical topology record between the source POP and the destination POP.

After the abstract logical topology records of every POP pair in the POP set are obtained according to the foregoing processing procedure, n*(n−1) abstract logical topology records that reflect the basic network topology may be obtained. The abstract logical topology records may be stored and displayed in multiple modes, and may be classified according to different security levels. For example, the forms shown in Table 1 and Table 2 are used.

TABLE 1

| Source POP | Destination POP | Weight value |
| --- | --- | --- |

TABLE 2

| Source POP | POPi/Routing device i | . . . | POPj/Routing device j | Destination POP | Weight value |
| --- | --- | --- | --- | --- | --- |

In Table 1, the source POP and the destination POP on the best path, and the sum of weight values of all links on the best path between the source POP and the destination POP are recorded; in Table 2, all POPs on the best path, and the sum of weight values of all links on the best path between the source POP and the destination POP are recorded.

Figure 5:
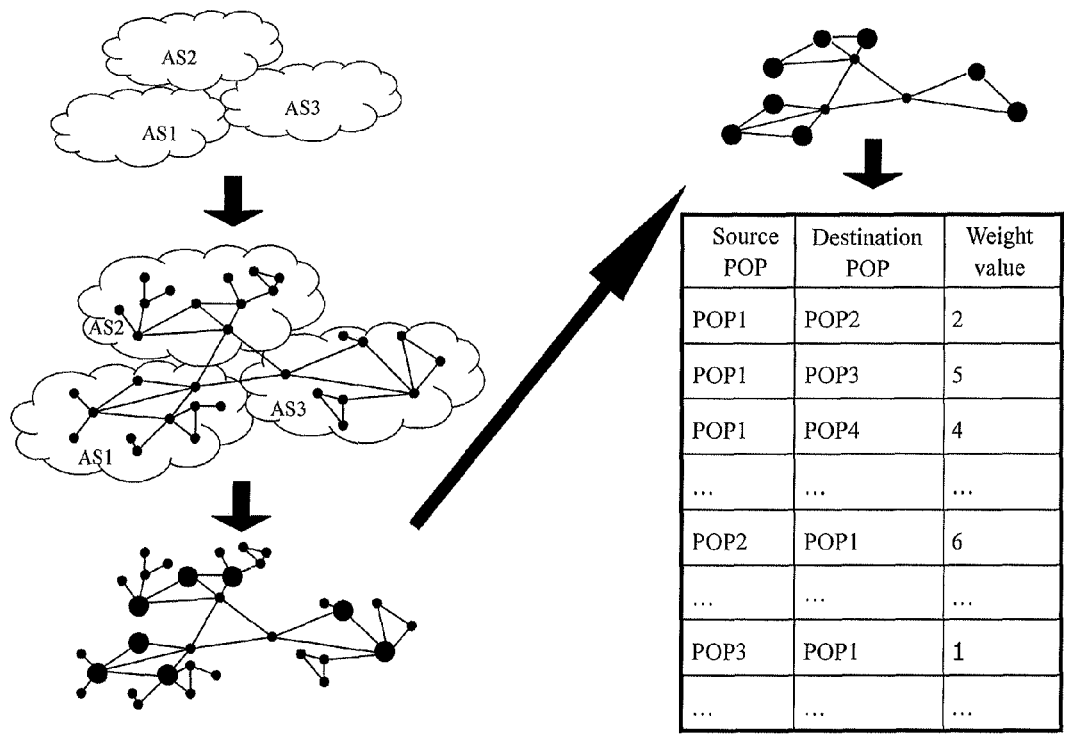
FIG. 5 is a schematic diagram of implementing a processing procedure of logical topology abstraction of an ISP network according to a processing procedure that is provided in the first embodiment according to the first embodiment of the present invention.

Taking an ISP network that includes three AS domains as an example, a schematic diagram of implementing a processing procedure of logical topology abstraction of the ISP network according to the forgoing processing procedure is shown in FIG. 5. The procedure mainly includes: First, collect the network topology information according to the routing protocol, and obtain the POP configuration condition from the MIB or manual configuration information; then, abstract the logical topology of the network according to the network topology information and the POP configuration condition, calculate the best path of each POP pair and the weight value of the best path, obtain the set of the abstract logical topology records of the ISP network, and store and display the set of the abstract logical topology records in the format in Table 1, as shown in FIG. 5; finally, transmit the set of the abstract logical topology records to the P2P application server to facilitate, for example, optimization of peer selection.

In this embodiment, information in an existing network topology visualization platform/product may be used to obtain basic network topology information and easily abstract the topology information. Therefore, network topology information that needs to be transmitted is greatly reduced, a risk of exposing lower-layer network topology information is mitigated, and the network topology information is transmitted to the P2P application server securely and concisely.

Embodiment 2

Figure 6:
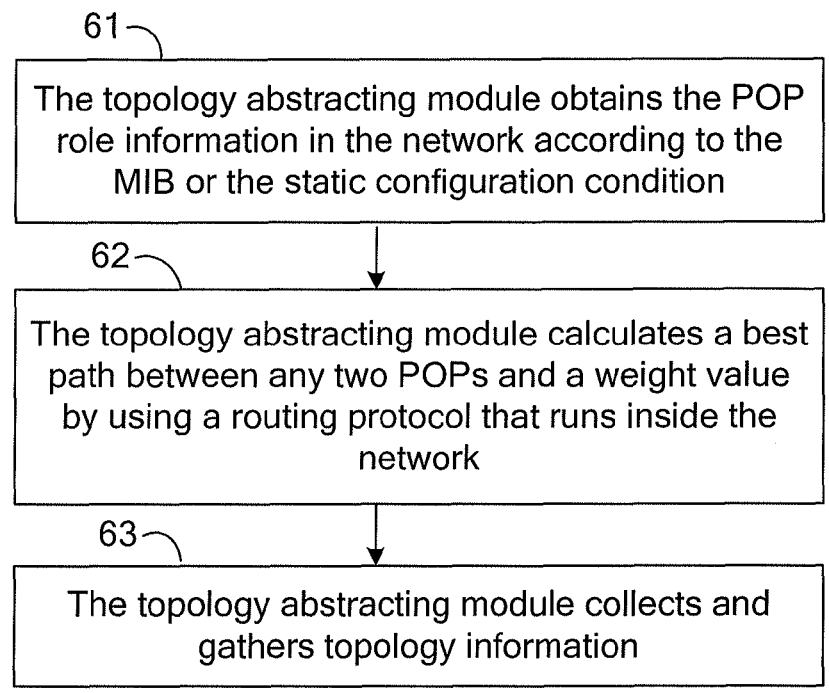
FIG. 6 is a flowchart of a method for abstracting logical topology information of a P2P network according to a second embodiment of the present invention.

FIG. 6 shows a processing procedure of a method for abstracting logical topology information of a P2P network according to this embodiment. The method includes:

61. A topology abstracting module obtains POP role information in a network according to an MIB or a static configuration condition.

Configuration modes of POPs in the network mainly include two modes: One mode is a private MIB storage mode, that is, the POPs are configured by a network management system, and POP configuration information is stored in the MIB of the network. In this case, the topology abstracting module may get access to the MIB through SNMP to obtain specific configuration information of the POPs. The other configuration mode is to configure the POPs manually and statically and store the configuration information of the POPs in a database. In this case, the topology abstracting module may obtain specific configuration information of the POPs by getting access to the database. Through the foregoing processing, a set of POPs, namely, {P1, P2, . . . , Pn}, in the network is obtained.

In conventional P2P network architecture, the POPs are deployed on multiple levels according to different network layers. According to different required levels of topology abstraction, the topology abstracting module should be able to obtain POP information of a specified level rather than being limited to abstract only logical network topology architecture of lowest-level POPs.

62. The topology abstracting module calculates a best path between any two POPs and a weight value of the best path by using a routing protocol that runs inside the network.

The topology abstracting module transmits the obtained POP set information to each POP in the network, and each POP stores the received POP set information.

Afterward, the best path between any two POPs and a weight value of the best path are calculated by using a relevant algorithm of the routing protocol that runs in an AS domain of the network, and by using each POP as a source peer and a destination peer respectively.

The process of calculating the best path between any two POPs and the weight value mainly includes: Add a relevant interface for a P2P traffic optimizing module to employ the routing protocol in the P2P network, and the topology abstracting module uses this relevant interface to send a calculation request through the routing protocol.

Each peer maintains the POP set information {P1, P2, ..., Pn} in the network, uses the local peer as a source peer, and uses the relevant algorithm of the routing protocol to calculate the best path from the local peer to any other POP in the POP set and the weight value. For example, Pi is the source peer and any other POP Pj in the POP set is a destination peer, and the best path between Pi and Pj, and the weight value Wij from Pi to Pj are calculated. Wij may be the sum of weight values of all links on the best path from Pi to Pj. The best path from Pi to Pj serves as an abstract logical topology record between Pi and Pj.

If the source POP and the destination POP are located in the same routing area, taking the OSPF protocol as an example, the relevant algorithm of the routing protocol may be an SPT algorithm of OSPF. If the source POP and the destination POP are located in areas that run different intra-domain routing protocols, an inter-domain routing protocol (such as BGP) needs to be used to calculate the best path between the two POPs.

63. The topology abstracting module collects and gathers topology information.

The topology abstracting module collects calculation results of the best path and the weight value that are obtained on each POP to obtain a set of abstract logical topology records of the P2P network. The set includes n*(n−1) abstract logical topology records. The set of abstract logical topology records is stored in the format in Table 1 or Table 2.

For example, when multiple equivalent best paths exist between the source POP and the destination POP, one of the paths is selected as the best path, and the best path serves as an abstract logical topology record between the source POP and the destination POP.

Afterward, the set of abstract logical topology records is transmitted to the P2P traffic optimizing module, and is finally sent to a P2P application server.

The processing procedure in this embodiment is simple and universal, without use of an existing network topology visualization platform/product. This embodiment provides a universal and efficient method for abstracting logical topology information, which greatly reduces network topology information that needs to be transmitted, mitigates a risk of exposing lower-layer network topology information, and transmits the network topology information to the P2P application server securely and concisely.

Embodiment 3

Figure 7:
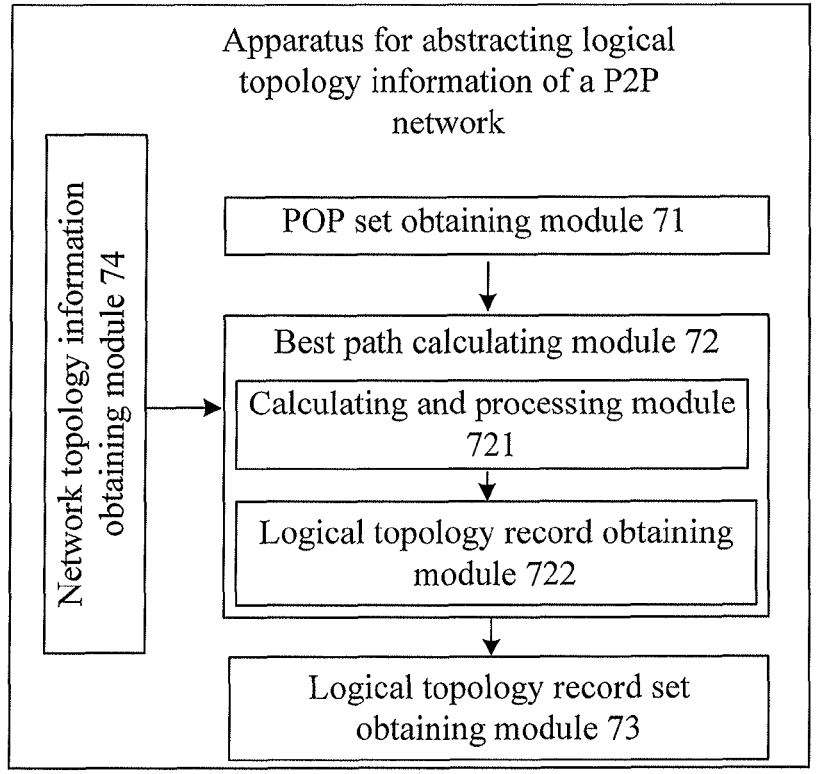
FIG. 7 is a block diagram of an apparatus for abstracting logical topology information of a P2P network according to a third embodiment of the present invention.

This embodiment of the present invention provides an apparatus for abstracting logical topology information of a P2P network. A specific implementation structure of the apparatus is shown in FIG. 7. The apparatus may specifically include:

a POP set obtaining module 71, configured to obtain a set of POPs of peer clients in the P2P network;

a best path calculating module 72, configured to use a relevant algorithm of a routing protocol in the P2P network to calculate a best path between any two POPs in the set of POPs and a weight value of the best path; and a logical topology record set obtaining module 73, configured to collect calculation results of the best path and the weight value that are obtained on each POP to obtain a set of abstract logical topology records of the P2P network.

For example, the apparatus further includes:

a network topology information obtaining module 74, configured to: use a routing protocol in each AS domain in the P2P network to collect network-topology-related information in the P2P network, or get access to an MIB in the P2P network through SNMP to obtain the network-topology-related information from the MIB.

For example, the best path calculating module 72 includes:

a calculating and processing module 721, configured to: use a relevant algorithm of the routing protocol to calculate the best path between a source POP and a destination POP in the set of POPs and the weight value of the best path according to POP role information in the P2P network, or according to the POP role information in the P2P network and the network-topology-related information.

In a practical application, each POP may calculate the best path from the local peer to any other POP in the POP set and the weight value respectively. Afterward, the calculating and processing module 721 collects the calculation results of the best path between POPs and the weight value that are obtained on each POP.

The best path calculating module 72 further includes a logical topology record obtaining module 722, which is configured to obtain an abstract logical topology record between the source POP and the destination POP according to the best path and the corresponding weight value, and store the logical topology record.

The apparatus for abstracting the logical topology information of the P2P network may be separately set in the P2P network, or set in a P2P traffic optimizing module in the P2P network.

Persons of ordinary skill in the art should understand that all or part of the steps of the methods provided in the foregoing embodiments may be implemented by a program instructing relevant hardware. The program may be stored in a computer readable storage medium. When the program runs, the steps of the methods in the foregoing embodiments are performed. The storage medium may be a magnetic disk, a Compact Disk-Read Only Memory (CD-ROM), a Read Only Memory (ROM), or a Random Access Memory (RAM).

To sum up, the embodiments of the present invention improve collection and abstraction of topology information in the P2P traffic optimizing module, provide a universal and efficient method for abstracting logical topology information, which greatly reduces network topology information that needs to be transmitted, mitigates the risk of exposing the lower-layer network topology information, transmits the network topology information to the P2P application server securely and concisely, and meet a requirement of network traffic optimization.

In an overall P2P traffic optimization solution, the topology information obtained by the topology abstracting module is widely applicable, may be transmitted to a P2P application to help optimize selection of a peer sequence, and may also facilitate procedures such as peer grouping and peer locating in the P2P application.

The abstract logical topology information records in the embodiments of the present invention may be stored and expressed flexibly in many modes.

The foregoing descriptions are merely embodiments of the present invention, but not intended to limit the protection scope of the present invention. Any modifications, variations, or replacements that can be easily derived by those skilled in the art shall fall within the protection scope of the present invention. Therefore, the protection scope of the present invention is subject to the appended claims.

What is claimed is:

1. A method for providing logical topology information of a Peer-to-Peer (P2P) network to a P2P application server, wherein the P2P network comprises a topology abstracting module, a plurality of Points of Presence (POPs) and a plurality of peer clients, each of the POPs connecting one or more peer clients, the logical topology information is used by the P2P application server to optimize a selection of a peer client, the method comprises:

obtaining, by the topology abstracting module, a set of Points of Presence (POPs) {P1, P2, . . . , Pn} in the P2P network by getting access to a management information base (MIB) storing configuration information of the POPs or by getting access to a database storing configuration information of the POPs;

transmitting, by the topology abstracting module, the set of POPs {P1, P2, . . . , Pn} to each POP in the P2P network;

collecting, by the topology abstracting module, calculation results of a best path and weight value from the each POP in the P2P network, wherein each POP calculates the best path from itself to each of the other POPs in the set of POPs {P1, P2, . . . , Pn} and the weight value by using relevant algorithm of a routing protocol;

obtaining a set of abstract logical topology records of the P2P network, wherein each of the abstract logical topology records includes a source POP, a destination POP and a sum of weight values of all links on the best path between the source POP and the destination POP; and transmitting, by the topology abstracting module, the set of abstract logical topology records to the P2P application server.

2. The method for providing the logical topology information of the P2P network according to claim 1, wherein the obtaining the set of POPs in the P2P network comprises:

getting access to the MIB in the P2P network through a Simple Network Management Protocol (SNMP), and obtaining POP role information in the P2P network from the MIB.

3. The method for providing the logical topology information of the P2P network according to claim 2, wherein:

when multiple equivalent best paths exist between the source POP and the destination POP, one of the paths is selected as the best path.

4. The method for providing the logical topology information of the P2P network according to claim 2, wherein the abstract logical topology record between the source POP and the destination POP further comprises:

all POPs on the best path between the source POP and the destination POP.

5. The method for providing the logical topology information of the P2P network according to claim 1, wherein the database stores information of the POPs configured manually.

6. A non-transitory computer readable medium encoded with instructions that, when executed by a processor, cause the processor to:

obtain a set of Points of Presence (POPs) {P1, P2, . . . , Pn} in a P2P network by getting access to a management information base (MIB) storing configuration information of the POPs or by getting access to a database storing configuration information of the POPs, wherein the P2P network comprises a plurality of POPs and a plurality of peer clients, each of the POPs connecting one or more peer clients;

transmit the set of POPs {P1, P2, . . . , Pn} to each POP in the P2P network;

collect calculation results of a best path and weight value from the each POP in the P2P network, wherein each POP calculates the best path from itself to each of the other POPs in the set of POPs {P1, P2, . . . , Pn} and the weight value by using relevant algorithm of a routing protocol;

obtain a set of abstract logical topology records of the P2P network, wherein each of the abstract logical topology records includes a source POP, a destination POP and a sum of weight values of all links on the best path between the source POP and the destination POP; and transmit the set of abstract logical topology records to a P2P application server, wherein the set of abstract logical topology records are used by the P2P application server to optimize a selection of a peer client.

7. An apparatus for providing logical topology information of a Peer-to-Peer (P2P) network, wherein the P2P network comprises a plurality of Points of Presence (POPs) and a plurality of peer clients, each of the POPs connecting one or more peer clients, the logical topology information is used by the P2P application server to optimize a selection of a peer client, the apparatus comprises a processor and a memory, wherein the memory is configured to store instructions that, when executed by the processor, cause the processor to:

obtain a set of Points of Presence (POPs) {P1, P2, . . . , Pn} in the P2P network by getting access to a management information base (MIB) storing configuration information of the POPs or by getting access to a database storing configuration information of the POPs;

transmit the set of POPs{P1, P2, . . . , Pn} to each POP in the P2P network;

collect calculation results of a best path and weight value from the each POP in the P2P network, wherein each POP calculates the best path from itself to each of the other POPs in the set of POPs {P1, P2, . . . , Pn} and the weight value by using relevant algorithm of a routing protocol;

obtain a set of abstract logical topology records of the P2P network, wherein each of the abstract logical topology records includes a source POP, a destination POP and a sum of weight values of all links on the best path between the source POP and the destination POP; and transmit the set of abstract logical topology records to a P2P application server, wherein the set of abstract logical topology records are used by the P2P application server to optimize a selection of a peer client.

* * * * *